UNITED STATES PATENT OFFICE.

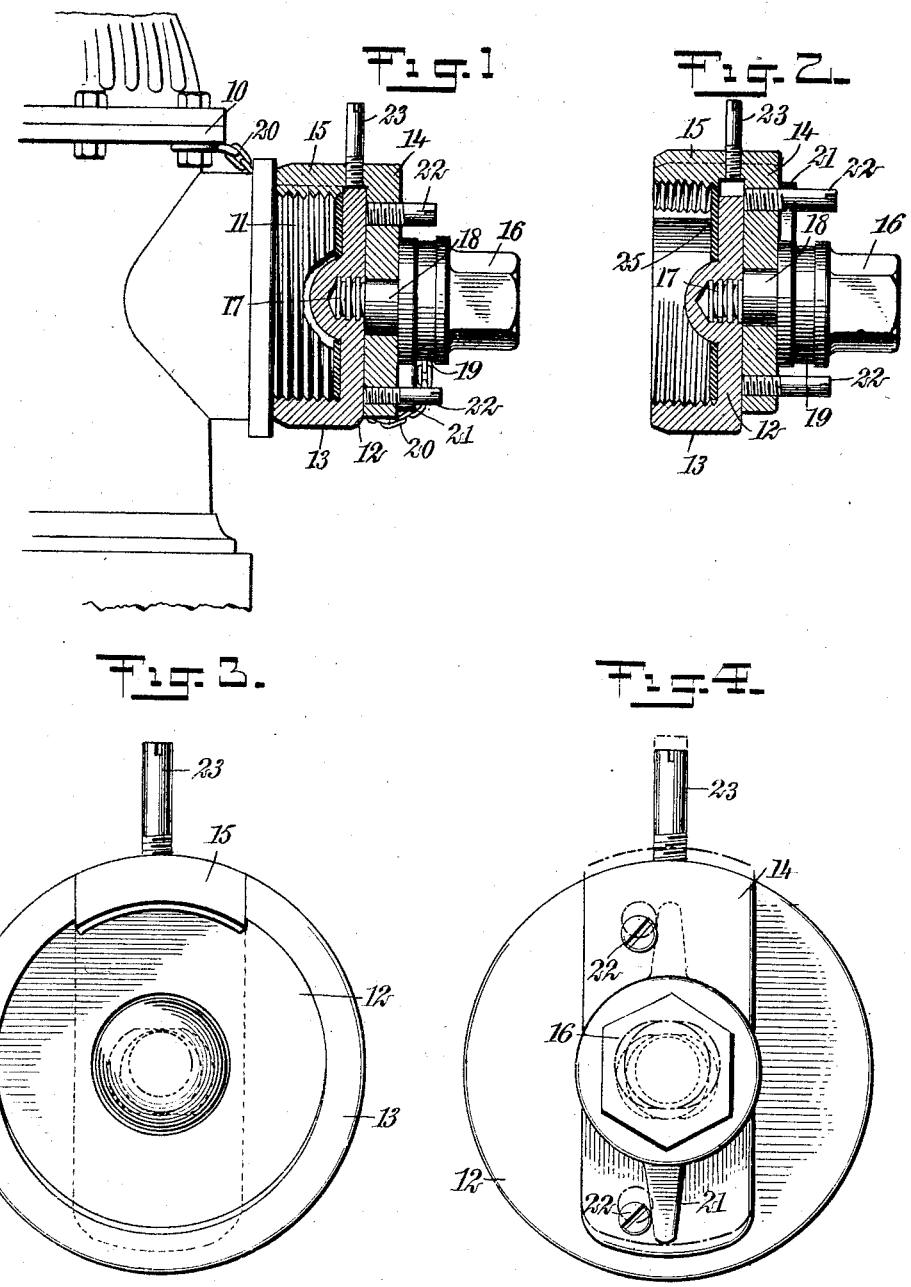

HARRY EDWARD SMITH, OF ROSLYN, WASHINGTON.

CONNECTING MECHANISM.

No. 866,529.  Specification of Letters Patent.  Patented Sept. 17, 1907.

Application filed November 10, 1906. Serial No. 342,796.

*To all whom it may concern:*

Be it known that I, HARRY EDWARD SMITH, a citizen of the United States, and a resident of Roslyn, in the county of Kittitas and State of Washington, have invented a new and Improved Connecting Mechanism, of which the following is a full, clear, and exact description.

This invention relates to certain improvements in mechanism for connecting threaded elements, and more particularly to means whereby said threaded elements may be quickly separated without necessitating the unscrewing of either.

My invention is particularly applicable for the adjustment of the caps of hydrants and the like, and is adapted to be used in connection with the ordinary threaded member of the hydrants now in use. By the employment of my invention it is possible to remove the cap from the hydrant by merely turning the locking member through one-half of a revolution and without rotating the cap member in the slightest.

Reference is to be had to the accompanying drawings forming a part of this specification, in which similar characters of reference indicate corresponding parts in all the figures, in which Figure 1 is a side elevation of a hydrant, showing in section my improved connecting means in its locked position; Fig. 2 is a section of the cap similar to Fig. 1, but showing the parts in their unlocked position; Fig. 3 is an elevation of the interior of the cap; and Fig. 4 is an elevation of the exterior of the cap, showing in dotted lines the position occupied when the parts are unlocked.

The hydrant 10 illustrated in the drawings, may be of any suitable form and provided with the usual threaded outlet member 11. It is customary to cover this outlet by a cap which is provided with screw threads coacting with the threads of the member 11, and in order to remove said cap, it is necessary to rotate the cap through many revolutions. In my improved cap I provide a plurality of movable sections, preferably two in number and provide operating mechanism whereby the relative positions of the two members may be adjusted. One of these members preferably comprises a plate 12 slightly larger than the end of the threaded member 11, and having a flange 13 inclosing said threaded member save for a short distance along one side. The interior of the flange 13 is screw-threaded throughout a portion of its inner circumference, and these screw threads may either end abruptly, or may, as indicated in Figs. 2 and 3, become gradually reduced in size and disappear at oppositely-disposed points. All that is essential is that the screw-threaded portion shall be less than one-half the inner circumference of the flange 13. The second movable section comprises a plate 14 in engagement with the outer surface of the plate 12 and extending from one edge to a point adjacent the opposite edge. This plate 14 carries a flange 15 fitting into the opening in the circumference of the flange 13, and having screw threads upon its inner surface oppositely disposed to the screw-threaded portion of the flange 13.

By moving the plate 14 diametrically in respect to the plate 12, the position of the flange 15 in respect to the threaded portion of the flange 13, may be adjusted. For effecting this adjustment, I preferably provide an actuating mechanism comprising a rotary member 16, having the inner end 17 thereof screw-threaded and fitting into a screw-threaded socket in the center of the plate 12. This member passes through the plate 14 and the portion in engagement with said plate is provided with an eccentric 18 operating within an elongated slot of the plate 14. The member is provided with an annular groove 19, whereby a chain 20 may be employed to connect the hydrant and the cap, while the outer end of the member 16 may be made hexagonal in shape, whereby the member may be rotated by the use of a suitable wrench. The member 16 carries a pointer 21 in contact with the outer surface of the plate 14, and this pointer is so disposed in respect to the eccentric 18 that the position of the latter may be thus indicated. The plate 12 is provided with a plurality of stops 22 for engagement with the pointer 21, whereby the actuating member 16 is prevented from rotating more than the desired amount. When the pointer 21 is in engagement with one of the stops, the eccentric will be in such a position that the plate 14 will be moved to its maximum amount in respect to the plate 12; while when the pointer is in contact with the opposite stop, the parts will be moved to their maximum position in the opposite direction.

With the eccentric disposed in the position indicated in Fig. 1, the flange 15 is forced toward the threaded portion of the flange 13 and the cap is held firmly in engagement with the threaded member 11. As the eccentric 18 is rotated to the position shown in Fig. 2, the plate 14 is moved longitudinally and the flange 15 moved out of engagement with the threads of the member 11. The entire cap may then move a sufficient amount for the threads of the flange 13 to be brought out of engagement with the threads of the member 11, and the entire cap may thus be removed from the member 11 by simply turning the member 16 through a half revolution and without rotating the entire cap. By means of the threaded portion 17 of the member 16, the plates are forced together as the member is rotated, thus by a single operation the parts are doubly locked or unlocked.

The stops 22 are preferably in the form of screw bolts extending entirely through the plate 14, so that by adjusting these screw bolts longitudinally they may be made to contact with the outer surface of the plate 12, while the plates 12 and 14 are at any desired distance apart, and the plate 14 and the flange 15 held from further longitudinal movement after the flange 15 has been brought radially into firm engagement with the threaded member 11. The outer end of the plate 14, adjacent the flange 15, may, if desired, be provided with a screw bolt 23 passing entirely through the plate and adapted to engage with the end of the plate 12, whereby the radial distance through which the flanges 15 and 13 may be moved in respect to each other can be readily controlled. A gasket 25 is preferably provided upon the inner surface of the plate 12, so that when said plate is placed in contact with the outer end of the threaded member 11, a tight joint may be formed.

If it is desired to tighten the cap to a still greater extent than is possible by the endwise movement of the cap and the turning of the locking member, this is possible by further rotating the actuating member 16 by means of the same wrench employed to lock the parts in position, and as the pointer 21 is at that time in contact with one of the stops 22, the further turning of the actuating member 16 will serve to rotate the entire cap. and in this manner the cap may be secured to the hydrant as firmly as may be desired.

Having thus described my invention, I claim as new and desire to secure by Letters Patent:

1. A threaded cap, comprising a plurality of movable sections, and means for moving one of said sections in a radial direction and simultaneously moving it longitudinally in respect to the remainder of the cap.

2. The combination with a threaded member, of a coacting cap, said cap comprising an annular flange, one section of said flange being radially movable, and means for moving said section radially in respect to the cap and simultaneously binding said section to the remaining portion of the cap.

3. The combination with a threaded member, of a coacting cap comprising a plate, a flange carried thereby and adapted to engage with one side of the threaded member, a second plate in engagement with said first mentioned plate and having a flange adapted to engage with the opposite side of the threaded member, and means carried by the first mentioned plate for actuating the flanges to grip the threaded member.

4. The combination with a threaded member, of a coacting cap comprising a plate, a flange carried thereby and adapted to engage with one side of the threaded member, a second plate in engagement with said first mentioned plate and having a flange adapted to engage with the opposite side of the threaded member, and means carried by the first mentioned plate and extending through the second mentioned plate for actuating the flanges to grip the threaded member.

5. The combination with a threaded member, of a coacting cap, said cap comprising a plate, a flange carried thereby and adapted to engage with one side of the threaded member, a second plate overlapping said first mentioned plate and having a flange adapted to engage with the opposite side of the threaded member, and means carried by the first mentioned plate and extending through the second mentioned plate for actuating said flanges to grip the threaded member.

6. The combination with a threaded member, of a coacting cap, said cap comprising a plate, a flange carried thereby and adapted to engage with one side of the threaded member, a second plate overlapping the first mentioned plate and having a flange adapted to engage with the opposite side of the threaded member, and actuating means pivotally mounted in the first mentioned plate and having an eccentric in engagement with the second mentioned plate.

7. The combination with a threaded member, of a coacting cap, said cap comprising a plate, a flange carried thereby and adapted to engage with one side of the threaded member, a second plate overlapping the first mentioned plate and having a flange adapted to engage with the opposite side of the threaded member, and an actuating member screw-threaded to said first mentioned plate and having an eccentric in engagement with the last mentioned plate.

8. The combination with a threaded member, of a coacting cap, said cap comprising a plate, a flange carried thereby and adapted to engage with one side of the threaded member, a second plate overlapping the first mentioned plate and having a flange adapted to engage with the opposite side of the threaded member, and an actuating member screw-threaded in a socket in the first mentioned plate and having an eccentric within an opening in the second mentioned plate.

9. The combination with a threaded member, of a coacting cap, said cap comprising a plate, a flange carried thereby and adapted to engage with one side of the threaded member, a second plate overlapping the first mentioned plate and having a flange adapted to engage with the opposite side of the threaded member, an actuating member pivotally connected to the first mentioned plate and having a cam surface in engagement with a portion of the second mentioned plate, and means carried by said actuating member for limiting the movement thereof.

10. The combination with a threaded member, of a coacting cap, said cap comprising a plate, a flange carried thereby and adapted to engage with one side of the threaded member, a second plate overlapping the first mentioned plate and having a flange adapted to engage with the opposite side of the threaded member, an actuating member having a threaded portion in engagement with a socket in the first mentioned plate and having a cam surface in engagement with a portion of the second mentioned plate, whereby upon rotating said actuating means, the flanges are moved to grip the threaded member and said plates are bound together, and means carried by one of said plates for engagement with the other plate to limit the respective movement of said plates.

In testimony whereof I have signed my name to this specification in the presence of two subscribing witnesses.

HARRY EDWARD SMITH.

Witnesses:
 HENRY SMITH,
 ALBERT SMITH.